United States Patent
Newell et al.

(10) Patent No.: US 10,390,096 B2
(45) Date of Patent: Aug. 20, 2019

(54) COLLECTING MEDIA CONSUMER DATA

(71) Applicant: EchoStar Technologies L.L.C., Englewood, CO (US)

(72) Inventors: Nicholas Brandon Newell, Centennial, CO (US); Swapnil Anil Tilaye, Superior, CO (US)

(73) Assignee: DISH Technologies L.L.C., Englewood, CO (US)

( * ) Notice: Subject to any disclaimer, the term of this patent is extended or adjusted under 35 U.S.C. 154(b) by 305 days.

(21) Appl. No.: 15/268,189

(22) Filed: Sep. 16, 2016

(65) Prior Publication Data

US 2018/0084022 A1   Mar. 22, 2018

(51) Int. Cl.
| | |
|---|---|
| H04N 21/475 | (2011.01) |
| H04L 29/08 | (2006.01) |
| H04N 21/422 | (2011.01) |
| H04N 21/25 | (2011.01) |
| H04N 21/258 | (2011.01) |
| H04N 21/658 | (2011.01) |
| H04L 29/06 | (2006.01) |
| G10L 25/51 | (2013.01) |
| G10L 25/63 | (2013.01) |

(52) U.S. Cl.
CPC ..... *H04N 21/4756* (2013.01); *H04L 65/1069* (2013.01); *H04L 65/4092* (2013.01); *H04L 65/602* (2013.01); *H04L 65/604* (2013.01); *H04L 67/141* (2013.01); *H04N 21/252* (2013.01); *H04N 21/25891* (2013.01); *H04N 21/42202* (2013.01); *H04N 21/42203* (2013.01); *H04N 21/6582* (2013.01); *G10L 25/51* (2013.01); *G10L 25/63* (2013.01); *H04L 67/18* (2013.01)

(58) Field of Classification Search
CPC ....... G10L 15/00; H04L 65/601; H04L 67/18; H04N 21/252; H04N 21/42202; H04N 21/42203; H04N 21/4756; H04N 21/6582
See application file for complete search history.

(56) References Cited

U.S. PATENT DOCUMENTS

| | | | | |
|---|---|---|---|---|
| 9,602,872 | B2* | 3/2017 | Park | G06F 3/011 |
| 9,967,618 | B2* | 5/2018 | Blong | H04L 51/32 |
| 2003/0118974 | A1* | 6/2003 | Obrador | G09B 23/28 |
| | | | | 434/236 |
| 2005/0132420 | A1* | 6/2005 | Howard | G06F 3/017 |
| | | | | 725/135 |
| 2011/0214141 | A1* | 9/2011 | Oyaizu | H04N 7/173 |
| | | | | 725/12 |
| 2012/0254909 | A1* | 10/2012 | Serdiuk | H04N 7/163 |
| | | | | 725/12 |
| 2013/0100307 | A1* | 4/2013 | Curcio | H04N 21/2187 |
| | | | | 348/222.1 |
| 2013/0282829 | A1* | 10/2013 | Lou | G06Q 10/101 |
| | | | | 709/204 |

(Continued)

*Primary Examiner* — Mohamed A. Wasel
(74) *Attorney, Agent, or Firm* — Bejin Bieneman PLC

(57) ABSTRACT

A computer including a processor programmed to receive audio data from sensors. Based on the audio data, the computer identifies a media content item. The computer is further programmed to detect the end of the media content item based on the audio data. Upon detecting the end of the media content item, the computer is programmed to store data from a user related to the media content item.

21 Claims, 4 Drawing Sheets

(56) References Cited

U.S. PATENT DOCUMENTS

| | | | |
|---|---|---|---|
| 2014/0122059 A1* | 5/2014 | Patel | G06F 16/40 704/9 |
| 2015/0020086 A1* | 1/2015 | Chen | H04N 21/44218 725/12 |
| 2015/0185964 A1* | 7/2015 | Stout | G06F 3/0481 715/716 |
| 2016/0234034 A1* | 8/2016 | Mahar | H04L 12/282 |
| 2017/0374402 A1* | 12/2017 | Pogorelik | H04N 21/84 |
| 2018/0059778 A1* | 3/2018 | Tyagi | G06F 3/165 |
| 2018/0124144 A1* | 5/2018 | Gonzalez | H04L 65/60 |

* cited by examiner

COLLECTING MEDIA CONSUMER DATA

BACKGROUND

User feedback concerning media content such as movies or the like can be unreliable, or even unobtainable, where collection of the feedback is delayed, or relies on subjective inputs, such as user-defined ratings. A content provider may lack ways to obtain feedback from a user consuming media content, e.g., provided via the Internet, a cable or satellite delivery system, etc., unless the user, at some time after the media content has been consumed, actively inputs feedback. Thus, user feedback may be inaccurate due to the passage of time and/or a user's circumstances when actively providing the feedback, e.g., tired, having a poor memory of the media content, etc. Further, current active feedback mechanisms often fail to obtain feedback because they require a user to initiate steps to provide feedback, e.g., provide a rating via an interactive program guide interface, provide a rating via a website, etc. Accordingly there is a need for an improved user feedback collection infrastructure and delivery system.

DRAWINGS

DETAILED DESCRIPTION

Exemplary System

A system includes sensors and a user device such as a mobile telephone that receives data from the sensors. The user device is in communication with a network-based computer, i.e., a remote computer accessed by a wide area network such as the Internet. The remote computer may be geographically remote, for example, in a different city, state or even country. Alternatively, the remote computer may be a server located in the same premises as the user, for example in a central location in a movie theatre where a user has viewed a media content item. The network-based computer includes a monitoring application that identifies, based on audio data, a media content item that is being viewed by a user. While the media content is being provided, the application monitors, receives and stores data from the sensors, including data from monitoring user physiology, user motion, user speech (verbal data), user facial expressions and user environment. Upon determining that provisioning, e.g., streaming, of the media content item is ended, the application uses audio and/or visual sensors (i.e., microphones and/or cameras) to monitor a user environment to collect verbal and/or visual data from the user.

The application may further play back segments to which the user or a group of users had a particularly strong response based on the physiological, motion, verbal, facial expression, and/or environment data, and record the user's or group of users' response(s) to the playback. Data collected from users may be provided to media content providers.

System Elements

Figure 1:
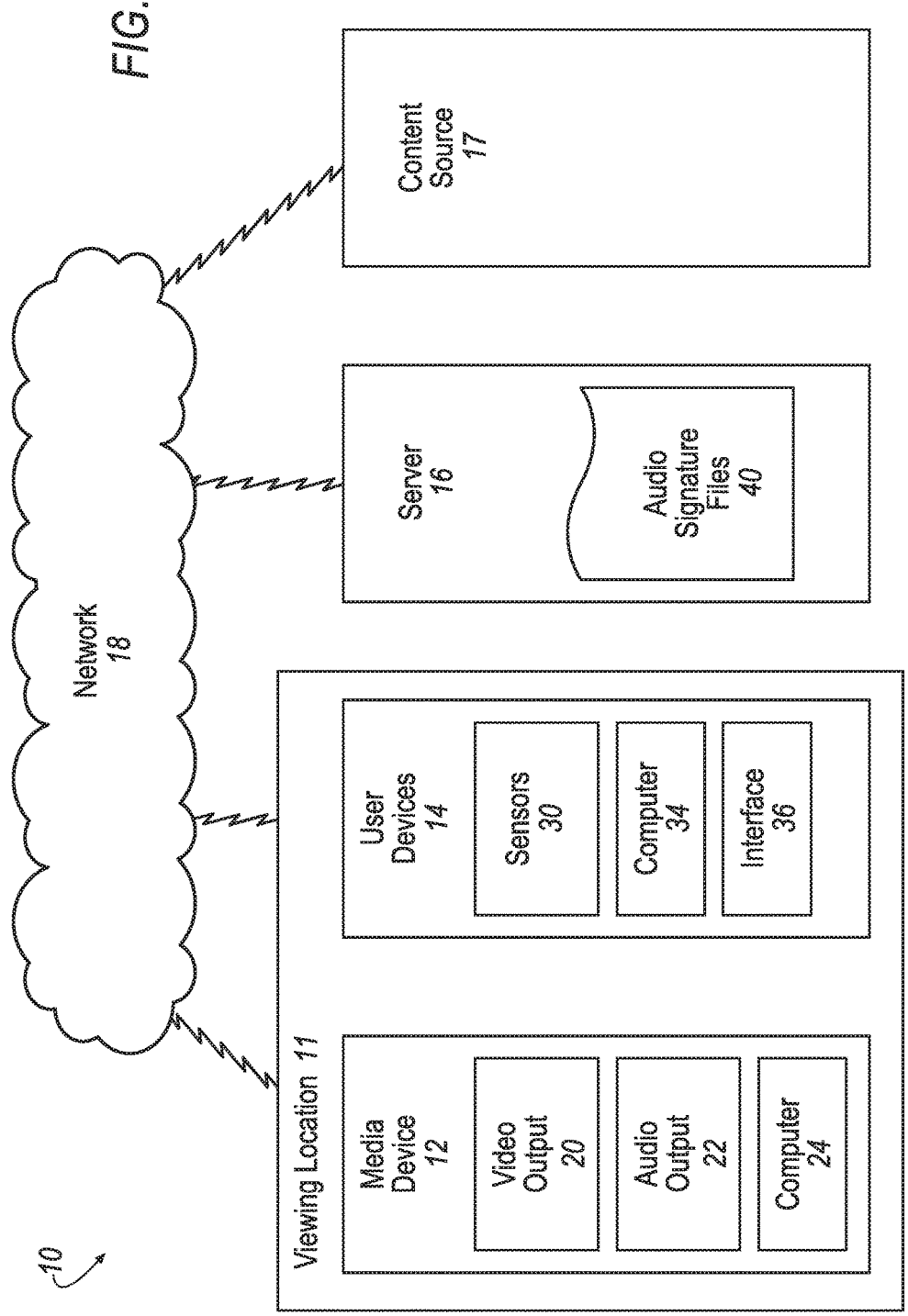
FIG. 1 is a diagram of an exemplary system for collecting user data related to a media content item.

As shown in FIG. 1, an exemplary media system 10 includes a media device 12, one or more user devices 14, a server 16, a content source 17 and a network 18. The media devices 12 and one or more user devices 14 may be included in a viewing location 11. The one or more user devices 14 include and/or are communicatively coupled with sensors for collecting data related to the user and the environment of the user.

The media device 12 receives and displays media content, and is typically a known device such as a set-top box, smart television, laptop, desktop, tablet computer, game box, etc. The term "media content" as used herein, refers to digital audio and/or video data received by the media device 12 and displayed for viewing by one or more users. The media content may be received, for example, from the content source 17 via the network 18.

The media content is typically delivered as compressed audio and/or video data. For example, the data may be formatted according to known standards such as MPEG or H.264. MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content may be provided to a media device 12 in a format such as the MPEG-1, MPEG-2 or the H.264/MPEG-4 Advanced Video Coating standards (AVC) (H.264 and MPEG-4 at present being consistent) and HEVC/H.265. As is known, MPEG and H.264 data include metadata, audio, and video components. Further, media content and advertisement content in the media system 10 could alternatively or additionally be provided according to some other standard or standards. For example, media content and advertisement content could be audio data formatted according to standards such as MPEG-2 Audio Layer III (MP3), Advanced Audio Coding (AAC), etc.

The media device includes an audio output 22, a computer 24 and may further include a video output 20.

The video output 20 is a display device such as a LCD display, plasma display, etc. for presenting visual data to the user. The audio output 22 is a speaker or other transducer for outputting audio data to the user.

The computer 24 includes a memory, and one or more processors, the memory storing program code, i.e., computer-executable instructions, executable by the processor. The computer 24 is operable to receive, in a known manner, media content, for example from the content source 17, and display the media content to a user via the video output 20 and audio output 22.

The user device 14 is typically a known device such as a mobile telephone, tablet, wearable device, or other portable computing device, etc., and includes one or more sensors 30, a compute 34 and an interface 36.

The sensors 30 collect data related to the user and the environment of the user and may include, as non-limiting examples, microphones, cameras, blood pressure monitors, pulse monitors, location sensors such as a global positioning system (GPS), temperature sensors (both for the environment and the user), etc.

The sensors 30 are programmed to collect data related to the environment of the user such as audio data and visual data and provide the data to the user device 14 computer 34. For example, as discussed in detail below, the sensors 30 may collect audio data related to a media content item that is being displayed by a media device 12 proximate to the user device 14. Proximate to the user device 14 may be defined herein to mean within a range that the user device 14 can receive the audio data generated by the media device 12. Alternatively, proximate to the user device 14 may be defined as within a same viewing location 11 as the user device 14, or within a fixed distance, for example, 10 meters, of the user device 14.

The sensors 30 are further programmed to collect data related to the user such as the blood pressure of the user, the heart rate of the user, motions of the user, facial expressions of the user, eye movements of the user, verbal data from the user, etc.

The user device 14 computer 34 includes a memory, and one or more processors, the memory storing program code, i.e., computer-executable instructions, executable by the processor. The computer 34 includes one or more applications such as a media content recognition application, a video recorder, a user blood pressure monitor, a user pulse rate monitor, a user location monitor, etc.

As described in detail below, the computer 34 is programmed to perform multiple operations including receiving audio data from the environment of the user, receiving physiological data from the user, receiving motion data from the user, receiving video and/or audio data from the user, establishing communications channels between the user and one or more other users, collecting data from conversations of the user, presenting data to the user, communicating with the user, etc. The computer 34 is communicatively coupled with the server 16, transmits data and instructions to the server 16 and receives data and instructions from the server 16.

The interface 36 may include one or more input elements such as buttons, a keyboard, a touchscreen, a microphone, a touchpad, a camera, etc. for receiving input from a user. The user interface 36 further includes one or more display elements such as an LCD display, speaker, light emitting diodes, buzzers, etc. for outputting data to the user. The computer 34 may, for example, output media content to the user via the interface 36. Further, the computer 34 may receive user input via the interface 36. The user input may include instructions, supplied, for example, via a graphical user interface (GUI), and may further include data such as visual data and audio data related to a media content item.

The server 16 is a computer including a processor and a memory, the memory storing instructions which may be executed by the processor. The server 16 is communicatively coupled with the user device 14, and may further be communicatively coupled with the content source 17 and the media device 12.

The server 16 may include, and/or have access to a library of audio signature files 40. Each audio signature file 40 may include representative audio data from a respective media content item. The server 16 is programmed to receive audio data from the user device 14 computer 34, and compare the audio data to the audio signature files 40. Based on audio pattern recognition techniques as are known, the server 16 is programmed to identify matches between the received audio data and one of the audio signature files 40 included in the library. In this manner, the server 16 determines a media content item associated with the audio data.

The content source 17 is typically a known computing device e.g., such as is included in one or more of a cable or satellite television headend, a video streaming service such as generally includes a multimedia web server (or some other computing device), etc. The content source 17 may provide media content, e.g., a movie, television program, documentary, etc. to the media device 12 and/or the user device 14.

The network 18 represents one or more mechanisms for providing communications, including the transfer of media content items, between the user device 14, media device 12, and the server 16. Accordingly, the network 18 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) and/or wide area networks (WAN), including the Internet, etc.

Figure 2:
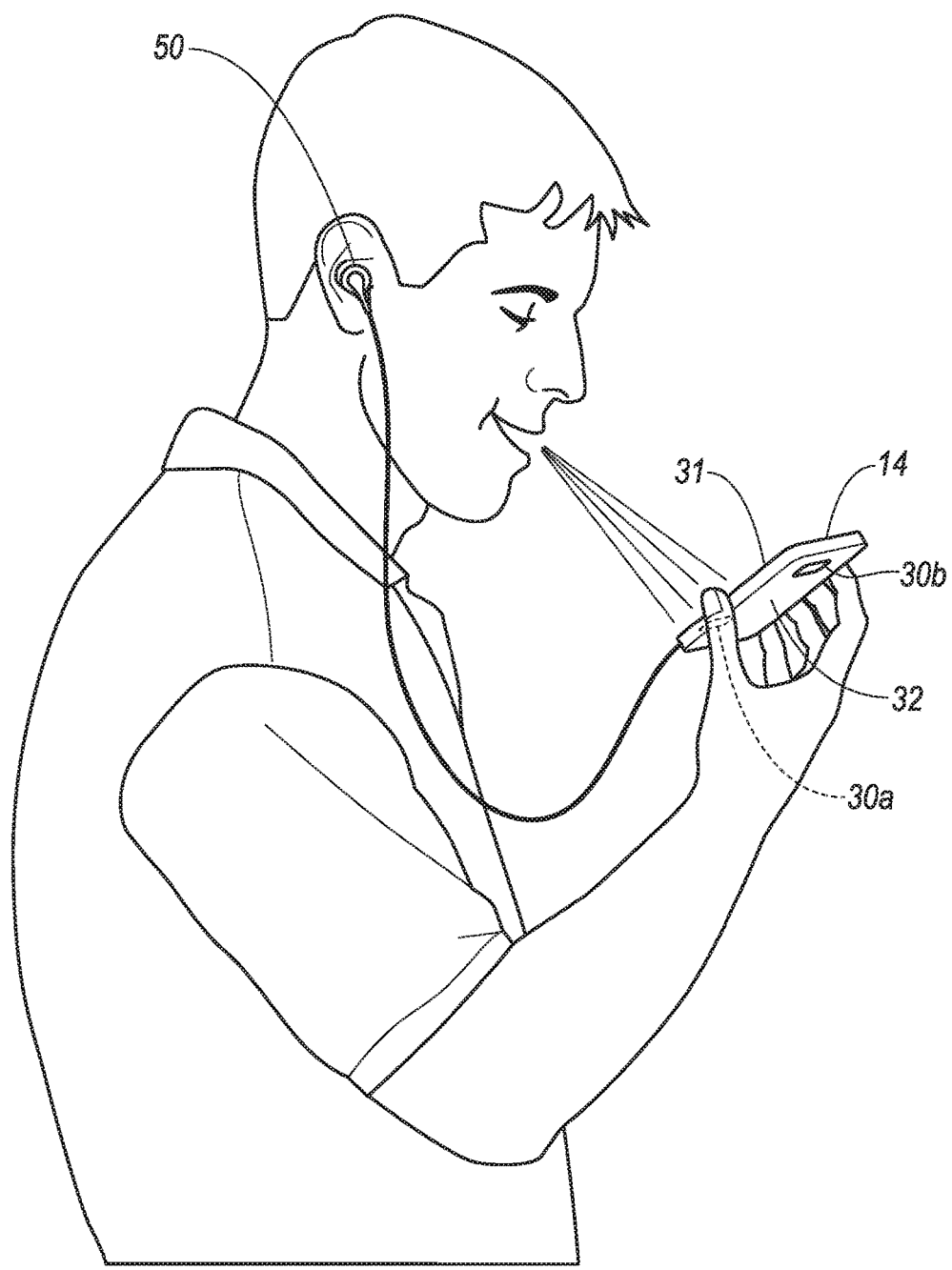
FIG. 2 illustrates a user with a user device having a first sensor for receiving user data and a second sensor for receiving environmental data.

FIG. 2 illustrates a user with the user device 14. An ear bud 50 is communicatively coupled with the user device 14.

The user device 14 includes a first sensor 30a on a front side 31 of the user device 14 and a second sensor 30b on a back side 32 of the user device 14. Each of the first sensor 31a and second sensor 30b include microphones.

The user device 14 computer 34 is programmed to perform noise cancelling of the environment as is known. The user device 14 computer 34 may receive, for example, environmental audio data from the second sensor 30b, and may further receive environmental audio data and user verbal data from the first sensor 30a. The computer 34 may identify the environmental audio data based on the data received from the second sensor 30b, and based on noise cancelling techniques as are known, cancel some or all of the environmental audio data received via the first sensor 30a.

Further, the user device 14 computer 34 may be programmed to recognize user verbal data, and distinguish the user verbal data from environmental data. The user device 14 may record user verbal data in a controlled (i.e., quiet) environment, and identify characteristics of the user verbal data. The user device 14 may, when receiving user verbal data in a noisy environment, filter the user data from the environmental data.

Based on the known noise cancelling techniques, and verbal data recognition techniques, the user device 14 may be able to receive verbal data from the user in a noisy environment, such as a movie theatre at the end of a movie when the audience is beginning to leave the theatre.

Exemplary Processes

Figure 3A:
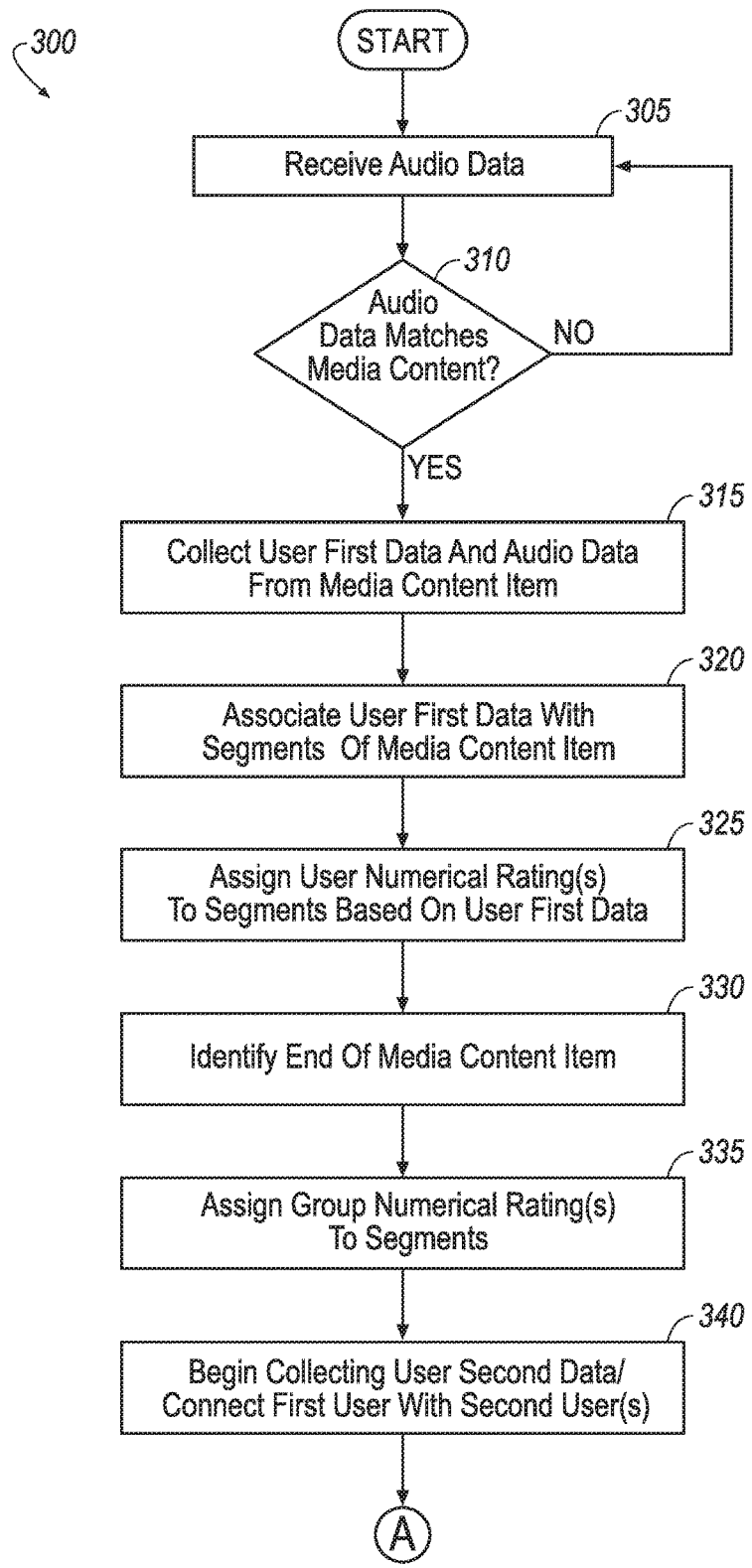
FIGS. 3A and 3B are a diagram of an exemplary process for collecting user data related to a media content item.
Figure 3B:
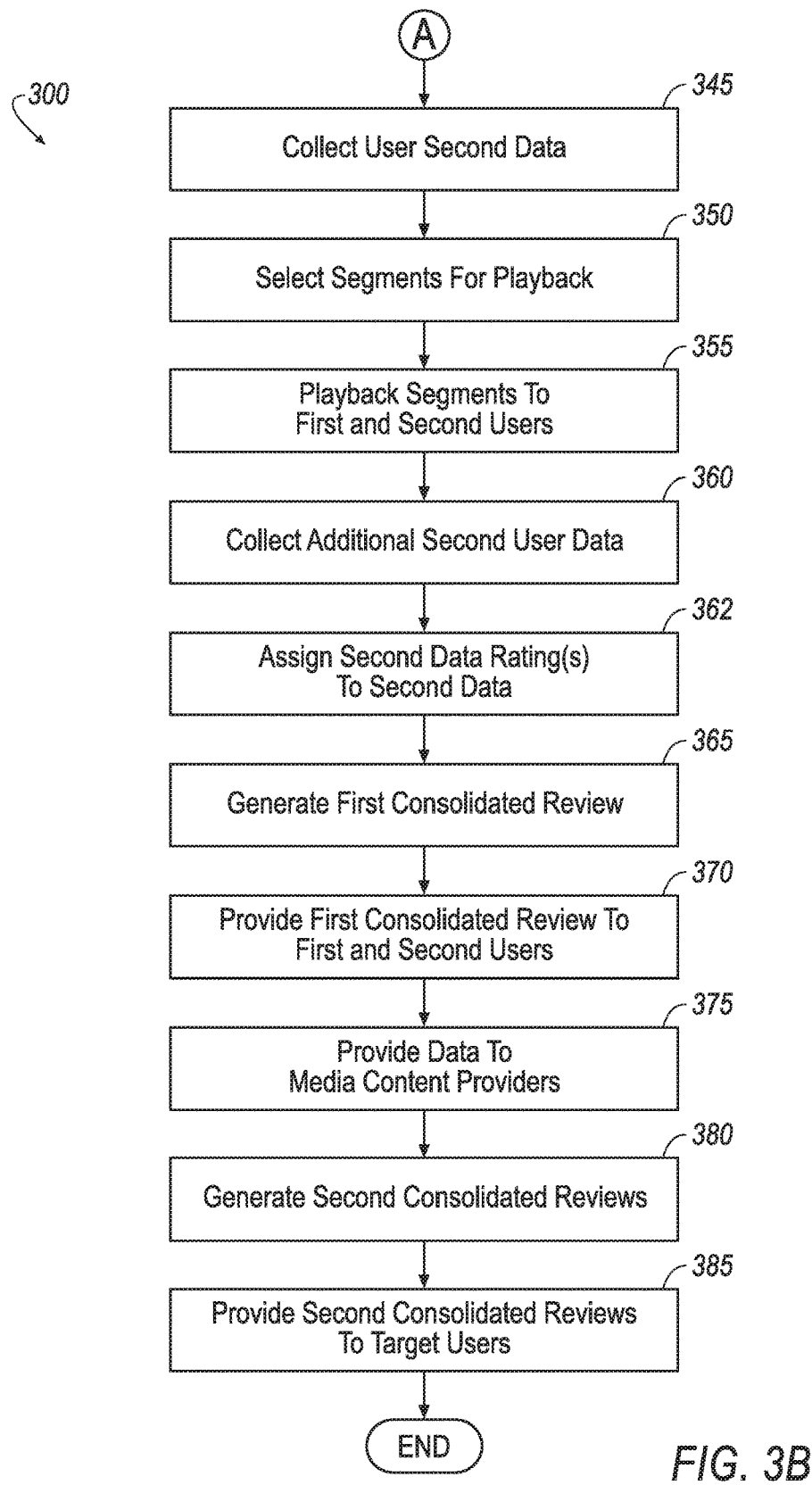

FIG. 3 is a diagram of an exemplary process 300 to collect user data from one or more respective users related to a media content item. The user data includes first data collected during the viewing of the media content item and second data collected after the viewing of the media content item. Each of the first and second data may include physiological data (blood pressure, pulse rate, etc.), motion data (standing up, sitting up, gestures, etc.), visual data such as facial expressions (smiles, frowns, expressions of surprise, tears, etc.), verbal data, eye movement data (for example, tracking objects in the media content item), location data, etc., related to the respective user. The process 300 starts in a block 305.

In the block 305, the user device 14 computer 34 receives audio data from an environment of the user device 14. The environment of the user device 14 refers herein to the area where the user device 14 is located (for example, the viewing location 11). Audio data from the environment may include audio data from a media content item that is currently being viewed, as well as other ambient sounds in the viewing location. The audio data may further include comments from the user of the user device 14, and other users within range to be detected by the user device 14.

The computer 34 transmits the audio data to the server 16 for analysis.

Although some steps are described below with reference to a single user device 14 computer 34, more than one user device 14 may be included in the process 300. For example, two or more users may be in a viewing location 11 together, with each user having a user device 14. Each user device 14 may receive respective user data, as well as audio data from the viewing location 11. The server 16 may receive data from each of the user devices 14. The viewing location 11 may be, for example, a room in a home. Alternatively, the viewing location 11 may be a public place such as a movie theatre, or an outdoor park. Accordingly, the process 300 may include a single user, or may include a large number of users, for example, several hundred users.

Upon receiving the audio data and transmitting the audio data to the server 16, the process continues in a block 310. Note that the description below is written with respect to a server 16. However, another computer, such as the computer 34, may also perform some or all of these operations.

In the block 310, the server 16 determines whether the audio data matches an audio signature file 40 of a media content item. As described above, the server 16 includes a library of audio signature files 40 representing audio data from respective media content items. The server 16 searches the library of audio signature files 40 to identify a signature file 40 in a known manner that matches the audio data received from the user device 14 computer 34.

In the case that no match is identified between the audio data received from the computer 34 and the store of audio signature files 40, the process 300 continues in the block 305. In the case that a matches identified, the process 300 continues in a block 315

In the block 315, server 16 collects first data from a first user of the first user device 14. As described above, the user device 14 sensors 30 may collect physiological data (blood pressure, pulse rate, etc.), motion data (standing up, sitting up, gestures, etc.), facial expressions (smiles, frowns, expressions of surprise, tears, etc.), verbal data, eye movement data (for example, tracking objects in the media content item), and location data related to the first user.

Additionally, and in parallel, the server 16 may continue to collect, via the first user device 14 sensors 30, audio data from the environment of the user device 14.

The server 16 may store the first data related to the first user and the audio data together with time stamps identifying when the first data and audio data were received.

Upon storing the first data related to the first user and audio data together with the time stamps, the process 300 continues in a block 320.

In the block 320, the server 16 identifies segments of the media content item, and associates portions of the first data with the respective segments.

Initially, the server 16 identifies one or more segments included in the media content item. The server may identify the segments based on metadata. For example, metadata associated with the media content item may indicate different scenes in the media content item, and indicate when each of the scenes begins and ends. As another example, the server 16, using image recognition techniques as are known, may identify scenes based on characters present, location, movement, etc.

Upon identifying the one or more segments of the media content item, the server 16 associates first data related to the first user with each of the segments. The server 16 may utilize timestamps associated with the first data to align the first data with the segments of the media content item. Upon associating the first data with respective segments of the media content item, the process 300 continues in a block 325.

In the block 325, the server 16 determines one or more first user numerical ratings for one or more respective segments of the media content item based on the first data related to the first user. As an example, the server 16 may determine a level of the emotional response of the first user to each segment of the media content based on one or more types of first data.

As described above, the first data may include one or more types of first data related to the first user including physiological data (blood pressure, pulse rate, etc.), motion data (standing up, sitting up, excited gestures, etc.), facial expressions (smiles, frowns, expressions of surprise, etc.), verbal data, eye movement data (for example, tracking objects in the media content item), and location data (where is the user, i.e., at home, in a theatre, etc.). The server 16 may, as an example, assign a numerical value, for example a value on a scale of from zero to ten, to one or more of the types of first data. A value of zero may indicate a low emotional response to the segment and a value of ten may indicate a high emotional response. The server 16 may then combined the values, for example by summing the values or taking an average of the values, and determine a single level of emotional response for the first user for the segment.

As an example, in order to determine an emotional response value for the physiological data, the server 16 may evaluate the pulse rate of the first user. The server 16 may compare the pulse rate of the first user while watching the segment of the media content item with pulse rate data from the public at large, a pulse rate from a demographic group matching the demographics of the user, a pulse rate from the user taken under controlled conditions, or another set of reference data. Based on the comparison, the server 16 may assign an emotional response value to the physiological data. A higher pulse rate may indicate a higher emotional response level relative to a lower pulse rate. For example first data related to the first user at or beyond the top of the reference data may be assigned a value of ten, first data at or below the bottom of the reference data may be assigned a value of zero and values may be scaled in between.

As another example, the server 16 may determine emotional response level for motion data. A high-level of motion may indicate that the first user is excited and accordingly be assigned a high emotional response level. Sitting still may indicate that the first user is bored and may be assigned a low emotional response level. As with the physiological data, the motion data may be compared with reference motion data based on the public at large, based on a demographic matching the demographics of the first user, based on baseline first user motion data, etc.

In this manner, the server 16 can determine a numeric rating for the first user based on a single value such as heart rate, and/or based on a combined or total score of multiple metrics indicative of the overall first user experience.

In addition to determining a level of emotional response, other types of numerical ratings may be developed based on the first data. For example, the server 16 may, based on the first data related to the first user, determine a level at which the first user likes or dislikes each segment of the media content item.

For example, the server 16 may receive verbal data, i.e., comments made by the first user while watching the media content item, and evaluate the verbal data. Positive words or phrases such as "beautiful", "moving", "funny", "I love this", etc., may be assigned high values, and negative words or phrases such as "stupid", "doesn't make sense", "can't believe I'm watching this", may be given low values. The server 16 could store a table or the like of such words or phrases, the table including numerical values associated with each word or phrase.

In a similar manner, facial expressions may be evaluated, to determine one or both of an emotion response value and a like/dislike value.

The server 16 may be programmed to recognize, as is known, different types of facial expressions such as smiles, frowns, grimaces, laughter, confusion, etc. The server 16 may maintain a table that assigns a like/dislike value between zero and ten to each type of expression. Laughter may be assigned, for example a value of ten. A smile may be assigned a value of nine, a frown a value of three and a grimace a value of one.

Further, the server 16 may be programmed to recognize, as is known, the emotional response level of facial expressions. The emotional response levels may be assigned, for example, numerical values from zero to ten. Facial expressions such as indications of surprise, fear, etc. may be assigned a high emotional response value, e.g., nine. Facial expressions such as a confused look, a disinterested or distracted look may be assigned a low emotional response value, e.g., one or two. The server 16 may further be programmed to recognize an emotional response level of a smile. A wide open smile with relaxed facial muscles may be assigned a high emotional response value (additionally or alternatively to a like/dislike value), and a smile that appears forced (e.g., tight lips, tension in the forehead) may be assigned a relatively lower emotional response value.

Other types of numerical values may also be determined for each segment. As one additional example, the server 16 may be programmed to collect first data related to eye movement. The server 16 may further be programmed to track the eye movements, as is known, and, correlate the movements to events in the media content item being viewed by the first user. Based on the eye movement data, a level of interest in the segment of the media content item may be determined. In a case that the eyes are responding to (e.g., tracking) events or characters in the media content item, or simply are focused on the display, a high level of interest may be determined; in the case that the eye motions do not correlate with events in the media content item or the first user frequently looks away from the display to glance at the first user's mobile device, etc., the server 16 may determine that the first user is not paying attention to the segment of the media content item.

Upon having assigned the one or more first user numerical ratings to each of the respective segments of the media content item, the process 300 continues in a block to 330.

In the block to 330, the server 16 identifies based on the audio data, an end of the media content item. As described with respect to the block 320, the server 16 continues to receive audio data related to the media content item. The server 16 compares the audio data with audio signature file 40 data of the end of the media content item. When the audio data matches the audio signature file 40 data of the end of the media content item, the server 16 determines that the media content item has ended. The process 300 continues in a block 335.

In the block 335, in the case that the server 16 is receiving first data from multiple user devices 14, related to multiple respective users, the server 16 assigns one or more group numerical ratings to the segments of the media content item.

Taking as an example a single segment of the media content item, the server 16 may receive one or more numerical values for each segment from each respective user. The server 16 may combine numerical values from each of the users to calculate group numeric values.

For example, three users may view a media content item. As described above the server 16 may generate a numeric value indicating an emotional response level for each segment for each user. To generate a group emotion response value for a particular segment, the server 16 may average the emotional response level of the three users for the particular segment.

In the case that the server 16 generates additional numeric values such as like/dislike values for each user for each segment, the server 16 can generate additional group values, again by taking the average of the values from the individual users.

In this manner, the server 16 can identify segments to which there was a strong group response. For example if a particular segment is assigned a group emotional response level of nine and a group like/dislike level of eight, the server 16 can determine that the particular segment had a strong group response and additionally that the group response was positive.

In a similar manner, the server 16 can assign one or more group numeric ratings to each of the other segments in the media content item. Upon assigning group numeric ratings to the segments, the process 300 continues in a block 340.

In the block 340, the server 16 collects, via the first user device 14, second data related to the first user. In some cases, the first user device 14 computer 34 may passively collect second data from the first user and provide the second data to the server 16. For example, the computer 34 may collect audio data of the first user conversing with another user from a microphone on the first user device 14. In other cases the server 16, via the first user device 14, may prompt the first user for second data. Specifically, the server 16 may prompt the first user for second data related to the media content item which is just ended.

The server 16 may request, via the first user device 14, as one example, that the first user provide second data related to the media content item. Based on the request, the first user may verbally provide the second data to the first user device 14 computer 34. The computer 34 may receive both second image data of the first user and second verbal data of the first user via the sensors 30 and transmit the data to the server 16.

As another example, the server 16 may establish a communications link between the first user and a second user.

In this case, the server 16 may initially select a second user to connect with the first user. The computer 34 may select the second user based on criteria such as whether the second user was present in the viewing location 11, whether the second user has viewed the media content item, whether the second user has a strong relationship with the first user, whether the second user likes similar types of media content as the first user, whether the second user has opposing views to the first user regarding media content items, etc.

For example, the server 16, based on (e.g., audio) data received from the first user device 14 and one or more second user devices 14, may know that a second user device 14, used by a second user, is in the same viewing location 11. The server 16 may instruct the first user device 14 computer 34 to call the second user device 14 computer 34. In this manner, the server 16 may establish the communications link between the first user and the second user.

As another example, based on historical (stored) data, the server 16 may know that the first user likes to discuss media content items with a second user, and further that the second user recently viewed the media content item. Based on this data, the server 16 may instruct the first user device 14 of the first user to call the second user device 14 of the second user.

As yet another example, the server 16 may know that, earlier on the same day, the first user spoke with the second user, and explained that the first user was planning to view the media content item. The server 16 may connect the first user with the second user (via first and second user devices 14) and establish a conversation to follow-up on the earlier conversation.

The server 16 may offer, on behalf of a service provider such as a media content provider, awards to the first user to provide second data. For example, the server 16 may offer points which can be exchanged for rentals of media content items, or which can be exchanged for movie theatre tickets.

Upon beginning to collect second data passively from the user, prompting the first user for second data, or establishing a communications link between the first user and the second user, the process 300 continues in a block 345.

In the block 345, the server 16 collects, via the first user device 14 and/or one or more second user devices 14, second data from the first user of the first user device 14 and second data from the second users of the one or more second user devices. For the purpose of describing the exemplary process 300, first user second data refers to data collected from the first user after identifying the end of the media content item. Second user second data refers to data collected from the one or more second users after identifying the end of the media content item.

The server 16 receives the second data, which can, e.g., be visual and/or audio data from the first user.

In the case that the first user is in a conversation with the second user, the server 16 may allow the conversation to proceed uninterrupted, and record the video and/or audio data of the conversation. In the case that the first user is providing visual and/or audio second data related to the media content item, and the first user continues to speak, the server 16 (via the first user device 14) may likewise continue to record the input from the first user.

Additionally or alternatively, the server 16, via the first user device 14, may prompt the first user with questions regarding the media content item. The questions may direct the first user to comment on specific elements of the media content item. For example, the server 16 may ask the first user to comment on the acting, the special effects, the soundtrack, the storyline, the dialogue, etc., of the media content item. The server 16 may further ask the first user to comment on particular segments of the media content item, such as a particular scene.

Upon having collected second data from the conversation of the first user and the one or more second users, and/or collecting second data provided by the first user, the process 300 continues in a block 350.

In the block 350, which may also be executed together with the block 345, the server 16 may provide input to the first user and/or one or more second users to trigger additional second data. The server 16 may present to the first user, via the first user device 14, segments of the recently viewed media content item to which the first user had a particularly strong response.

As described above with regard to the block 325, the server 16 assigns numerical ratings to segments of the media content item during the viewing of the media content item by the first user. The numerical ratings indicate for example an emotional response level and/or a like/dislike level for each of the segments. The computer 34 and/or the server 16 may, based on these assigned ratings, select a segment of the media content item to which the first user had an emotional response level above an emotional response threshold level, for example, seven, and additionally had a like/dislike level above a like/dislike threshold level, for example, seven, and replay this segment to the first user.

Other criteria could be used for selecting the segments to replay to the first user. The server 16 may, for example, select segments which the assigned ratings indicated that the user strongly disliked, or replay segments, which based on eye movement data, that the server 16 assigned a high interest rating to the first user.

In the case of the first user, the server 16 could replay the selected segment via the first user device 14 interface 36. The server 16 may further replay selected segments to the one or more second users via one or more respective second user devices 14 in a similar manner.

In the case of a group watching experience, for example the first user and multiple second users together in a movie theatre, the server 16 could select segments for replay based on assigned group ratings. The sever 16 can base the segment selection process on the group numerical ratings assigned to the segments, as described with respect to the block 335 above.

Upon selecting the segments to replay, to either the individual first and second users, or to a group of users, for example in a movie theatre, the process 300 continues in a block 355.

In the block 355, the server 16 initiates the replay of the selected segments to the first and/or second users, via one or more of the first user device 14, the second user devices 14, or the media device 12. Upon initiating the replay of the segments, the process 300 continues in a block 360.

In the block 360, the server 16 collects additional second data. While replaying the segment or segments, the server 16 may capture the video and/or audio response of the first user and/or second users. The server 16 may continue to collect second data from the first user and second users following the replay. In this manner, the server 16 may collect more immediate commentary from the first user with regard to those segments that were highlights for the first user.

Upon collecting the additional first data, the process 300 continues in a block 362.

In the block 362, the server 16 assigns second data ratings to the media content item and segments of the media content item based on the received second data.

The server 16 may analyze different components of the second data including words or expressions in the verbal data, facial expressions, and voice quality.

Based on the facial expressions, verbal data and voice quality data, the server 16 may assign one or more second data ratings to the media content item and/or to segments of the media content item.

The server 16 may initially determine that a word or phrase in the second data applies to a particular segment of the media content item.

In some cases, the server 16 may determine that the second data applies to a particular segment based on context. For example, the server 16 may determine that second data provided during the replay of a particular segment such as "I really loved this", or "This is funnier the second time than the first time" or "It was bad enough to have to watch this once" is associated with the segment based on one or both of the contents and the timing of receiving the second data.

In other cases, the server 16 may determine that the second data applies to a particular segment based on words in the feedback. For example, from the phrase "I really enjoyed the fight scene where they were walking on walls" the server 16 may be able to associate the phrase with a particular fight scene in the media content item that occurred in a room and involved actions that appeared to defy physics.

Upon associating the second data with the media content item as a whole or one of the segments of the media content item the server 16 may assign one or more numerical ratings to the segments based on the second data.

For example, as is described with respect to the block 325 above, the server 16 may, based on verbal data included in the first data, determine a first emotional response level for a segment or for the media content item as a whole. The server 16 may, upon having identified a phrase that refers to a particular segment, further analyze the phrase and identify words that indicate a response of the user. Based on the words, the server 16 may determine a numerical value for the first emotional response rating for the segment. As above, the numerical value may be in a range from zero to ten, where zero indicates a low emotional response level, and indicates a high emotional response level. Words such as "outstanding", "unbelievable", "made me cry", may be given a high emotional response level such as nine or ten. Words such as "boring", "lost my attention", "could have done without it", may be giving a low emotional response level such as one or two. As noted above, the server 16 could store a table of such words and phrases. The table could include numerical values associated with each word or phrase.

Additionally, the server 16 may assign a second emotional response rating based on facial expressions, as is known. Facial expressions indicating, for example, astonishment, fear, joy, and other strong emotions may be assigned a high first emotional response level rating such as nine or ten. Facial expressions indicating boredom, being distracted, etc., may be assigned a low second emotional response rating such as one or two.

In a similar manner, the first user voice quality data may be analyzed, as is known, and a second emotional response level assigned to the segment. Voice characteristics such as pitch, variations in pitch, speed of speech, variations in the speed of speech, voice intensity (volume), variation in voice intensity (decibels), etc. may be evaluated. The emotional response level may be assigned a value between zero and ten.

For example, the server 16 may determine, based on a high voice intensity, or a high level of variation in voice intensity of the first user, while commenting on a segment, that the first user had a high emotional response to the segment and assign an emotional response value of nine or a ten. A low voice intensity, or a low level of variation in voice intensity (monotone voice) may be assigned a low emotional response level of one or two.

The server 16 may determine the second emotional response level to a segment by combining (e.g., taking an average) of the emotional response level determined based on words and phrases, the emotional response level determined based on facial expressions, and the emotional response level based on voice quality.

Other types of ratings may also be assigned to the media content item as a whole or segments thereof. For example, as discussed above, the server 16 may determine second like/dislike levels and/or second interest/disinterest levels based on the second data.

Still further, the server 16 may determine third data ratings to the media content item or segments of the media content items. The third ratings may be constructed by combining ratings from first data (collected during the viewing of the media content item) and second data, collected after viewing the media content item. The third ratings may be generated by, e.g., summing or averaging the first ratings with the second ratings, respectively for the media content item, or segments of the media content item.

Upon generating the second ratings based on the second data, and/or generating the third ratings based on a combination of the first ratings and the second ratings, the process 300 continues in a block 365.

In the block 365, the server generates first consolidated reviews. The first consolidated review is a media content item generated from segments of the original media content item that was just viewed, along with first and/or second data from the users. The server 16 can generate the media content item for a single user, or for a group of users. The first consolidated review is generated in close time proximity to the first user or the group of users having viewed the original media content item. Close time proximity is defined herein as being within a predetermined period of time of the end of the media content item. The predetermined period of time may be for example three minutes or four minutes.

For a single user such as the first user, the first consolidated review may include one or more segments of the original media content item to which the first user had a strong response based on the first, second and/or third ratings, together with video and/or audio of the user commenting on the segments. The server 16 may select the segments to which the user had, for example, a high emotional response level, or a strong like dislike level based on the ratings and assemble them together into a single first consolidated review. The segments may be assembled, for example in chronological order as they appeared in the media content item, or in order from highest to lowest rating or lowest to highest rating, etc.

The server 16 may present the first consolidated review to the first user shortly for example three or four minutes, after having viewed the media content item.

For a group of users, the first consolidated review may include one or more segments of the original media content item to which, for example, the server 16 assigned a high group rating. The high group rating may be based on first data collected while watching the media content item and may further be based on second data collected after the end of the media content item. For the group of users, the first consolidated review may include video data from one or more of the first user and the second users as they comment on segments of the media content item. For example, the server 16 may display, for each segment, the commentary of one of the first or second users, together with the video portion of the media content segment.

The server 16 may determine which users' commentary to display, based on the first, second and third ratings. For example, the server may choose to display the commentary from the first or second user which had the highest (first, second or third) rating for emotional response level for the particular segment. The server 16 may settle ties based on a random (or pseudo-random) selection process.

The server may employ other algorithms to select the user's commentary. For example the server 16 may select only one commentary from each user. Further, the server 16 may select commentary from users with known expertise in a particular type of media content item, users who frequently provide reviews for media content items, etc. As another example the server 16 may select commentary from users previously unknown to the server 16 to encourage them to continue to participate in providing reviews.

The server 16 may display the first consolidated review for the group on the media device 12. For example, for a group of users in a movie theater, the server 16 may display the first consolidated review for the group on the movie theater screen.

Upon presenting the first consolidated review to the first user or the group of users, the process 300 continues in a block 375.

In a block 375, the server 16 may provide reviews to media content providers. The server 16 may make available to the media content providers the first and/or second data recorded by the first user or second users. Additionally or alternatively, the server 16 may provide the first consolidated reviews for individual users as well as first consolidated reviews for groups to the media content providers. Upon providing the first and/or second data recorded by the first user or second users, and the first consolidated reviews to the media content providers, process 300 continues in the block 380.

In the block 380, the server 16 may generate one or more second consolidated reviews. The one or more second consolidated reviews are reviews generated for a target audience and may include historical data.

For example, at the end of the calendar year, the server 16 may generate a second consolidated review for the first user. The second consolidated review may include highlights from one or more of the media content items that the first user viewed in the previous calendar year. The highlights may be selected based on the generated first, second and third ratings for the media content items and the segments of the media content items as described above. The server 16 may provide the second consolidated review to the first user to remind the first user of moments the first user particularly enjoyed during the previous year while consuming media content.

As another example, the server 16 may generate a second consolidated review for a family or group of friends. The server 16 may consolidate reviews from a particular time period from users belonging to the family or group of friends and provide the second consolidated review to the respective users.

Conclusion

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising a computer, the computer including a processor and a memory, the memory storing instructions executable by the processor such that the processor is programmed to:

receive first audio data from first sensors in a first user device associated with a first user, the first audio data including audio from a media content item;

identify, based on a match between the first audio data from the media content item received from the first sensors and an audio signature file, the first media content item;

detect an end of the first media content item based on the first audio data;
store, upon detecting the end of the first media content item, first user data including verbal data received after detecting the end of the first media content item related to the media content item; and
generate a second media content item based in part on the first media content item and in part on the first user data.

2. The system of claim 1, wherein the first user data received after detecting the end of the first media content item includes a conversation between a first user and a second user.

3. The system of claim 1, wherein the processor is further programmed to:
establish a communications link between the first user and a second user.

4. The system of claim 1, wherein the processor is further programmed to:
receive, during reception of the first audio data, and prior to the end of the first media content item, at least one of physiological data, motion data, location data, and verbal data related to the first user; and
associate portions of the at least one of physiological data, motion data, location and verbal data with a first segment of the media content item based on a correspondence in time.

5. The system of claim 4, wherein the processor is further programmed to:
determine, based at least in part on the at least one of physiological data, motion data, location data and verbal data associated with the first segment of the media content item, a first numerical rating of the first segment for the first user.

6. The system of claim 5, wherein determining the first numerical rating is further based at least in part on the first user data received after detecting the end of the first media content item.

7. The system of claim 5, wherein the processor is further programmed to:
select, based at least in part on the first numerical rating of the first segment, the first segment; and
display the first segment to the first user via the first user device.

8. The system of claim 7, wherein the processor is further programmed to:
record, during the displaying of the first segment to the first user, second data related to the first user, the second data related to the first user including verbal data.

9. The system of claim 8, wherein determining the first numerical rating is based at least in part on the second data related to the first user.

10. The system of claim 8, wherein the processor is further programmed to:
associate, based on recording the second data related to the first user while displaying the first segment to the first user, the second data related to the first user with the first segment.

11. The system of claim 1, wherein the first user data received after detecting the end of the first media content item includes video data.

12. The system of claim 1, wherein the processor is further programmed to:
request, via the first user device, the first user data received after detecting the end of the first media content item from the first user.

13. The system of claim 1, wherein the processor is further programmed to:
receive second audio data from second sensors; and
identify, based on the second audio data, the first media content item.

14. The system of claim 13, wherein the second sensors are associated with a second user device and the computer receives the second audio data from the second user device.

15. The system of claim 14, wherein the processor is further programmed to:
determine, based on the first audio data and second audio data that the first and second user devices are in a same location.

16. The system of claim 15, wherein the processor is further programmed to:
establish a communications link between the first user device and the second user device based in part on the determination that the first and second user devices are in the same location.

17. A system comprising a computer, the computer including a processor and a memory, the memory storing instructions executable by the processor such that the processor is programmed to:
receive first audio data from first sensors in a first user device associated with a first user;
identify, based on a match between the first audio data from the media content item received from the first sensors and an audio signature file, the first media content item;
detect an end of the first media content item based on the first audio data;
store, upon detecting the end of the first media content item, from a first user, first user data received after detecting the end of the first media content item including first verbal data related to the media content item, and, from one or more second users, respective second user data received after detecting the end of the first media content item including respective second verbal data related to the media content item; and
generate a second media content item based in part on the first media content item, in part on the first user data from the first user, and in part on the respective second user data from the one or more second users.

18. The system of claim 17, wherein the processor is further programmed to:
receive, during reception of the first audio data, and prior to the end of the first media content item, at least one of physiological data, motion data, location data, and verbal data related respectively to the first user and the one or more second users;
associate portions of the at least one of physiological data, motion data, location and verbal data respectively for each of the first user and one or more second users with a first segment of the media content item based on a correspondence in time; and
determine, based at least in part on the at least one of physiological data, motion data, location data and verbal data associated with the first segment of the media content item, a numerical rating of the first segment respectively for the first user and the one or more second users.

19. The system of claim 18, wherein the processor is further programmed to:
determine, based on the numerical ratings of the first segment respectively for the first user and the one or more second users, a group numeric rating for the first segment;

select, based at least in part on the group numerical rating of the first segment, the first segment; and display the first segment via a media display device.

20. A system comprising a computer, the computer including a processor and a memory, the memory storing instructions executable by the processor such that the processor is programmed to:

receive first audio data from first sensors in a first user device associated with a first user, the first audio data including audio from a media content item;

identify, based on a match between the first audio data from the media content item received from the first sensors and an audio signature file, the first media content item;

receive, during reception of the first audio data, and prior to an end of the first media content item, first user data related to a first user of the first user device;

detect the end of the first media content item based on the first audio data;

store, upon detecting the end of the first media content item, second user data related to the first user received after detecting the end of the first media content item related to the media content item;

associate portions of the first user data related to the first user received during reception of the first audio data with a first segment of the media content item based on a correspondence in time; and generate a second media content item based in part on the first media content item, in part on the first user data related to the first user received during reception of the audio data, and in part on the second user data related to the first user received after detecting the end of the first media content item.

21. The system of claim 20, wherein the first user data related to the first user received during reception of the audio data includes at least one of physiological data, motion data, location data, and verbal data related to the first user.

* * * * *